(12) United States Patent
Inagaki

(10) Patent No.: US 6,320,690 B1
(45) Date of Patent: Nov. 20, 2001

(54) SCANNING OPTICAL APPARATUS AND LASER SCANNING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,948

(22) Filed: Mar. 23, 2000

(30) Foreign Application Priority Data

Mar. 26, 1999 (JP) .................................................. 11-084348

(51) Int. Cl.$^7$ .................................................. G02B 26/08
(52) U.S. Cl. .................... 359/208; 359/204; 359/216; 359/207
(58) Field of Search .................... 359/208, 204, 359/216–219, 207

(56) References Cited

U.S. PATENT DOCUMENTS

| | | | |
|---|---|---|---|
| 5,013,108 | * 5/1991 | Van Amstel | 359/208 |
| 5,408,095 | 4/1995 | Atsuumi et al. | |
| 5,488,502 | 1/1996 | Saito | |
| 5,751,464 | * 5/1998 | Yoshikawa et al. | 359/208 |
| 5,774,249 | 6/1998 | Shiraishi et al. | |
| 5,801,869 | 9/1998 | Yoshikawa et al. | |

FOREIGN PATENT DOCUMENTS

| | | |
|---|---|---|
| 6-186492 | 7/1994 | (JP) . |
| 8-122635 | 5/1996 | (JP) . |
| 10-78558 | 3/1998 | (JP) . |

* cited by examiner

*Primary Examiner*—James Phan
(74) *Attorney, Agent, or Firm*—Burns, Doane, Swecker & Mathis, LLP

(57) ABSTRACT

A scanning optical apparatus is provided with a light source for emitting a light beam, a deflector, and at least two reflecting surfaces. The deflector deflects the light beam emitted from the light source so that the light beam scans the scanned surface. Each of the two reflecting surfaces has an optical power both in the main-scanning direction and the sub-scanning direction and is not rotation-symmetric about an axis.

21 Claims, 12 Drawing Sheets

SCANNING OPTICAL APPARATUS AND LASER SCANNING APPARATUS

This application is based on application No. H11-084348 filed in Japan on Mar. 26, 1999, the entire content of which is hereby incorporated by reference.

FIELD OF THE INVENTION

The present invention relates to a laser beam scanning apparatus for use in a laser printer or the like.

BACKGROUND OF THE INVENTION

Conventionally, in the field of laser beam scanning apparatuses of this type, for example as disclosed in U. S. Pat. Nos. 5,801,869 and 5,408,095, a technique has been proposed whereby two mirrors are combined together to form a scanning optical system so as to realize a laser beam scanning apparatus that offers stable image-formation performance against wavelength fluctuations in the light emitted from a light source.

In this construction, however, the mirrors are each so designed to have a reflecting surface that is rotation-symmetric about an axis. This makes it impossible to achieve satisfactory correction of aberrations. For example, in the construction disclosed in U.S. Pat. No. 5,408,095, the two mirrors constituting the scanning optical system have their reflecting surfaces formed as an axisymmetric aspherical surface and a cylindrical surface, respectively. This makes it difficult to achieve proper correction of fθ characteristics and curvature of field.

On the other hand, in the construction disclosed in U.S. Pat. No. 5,801,869, the two mirrors constituting the scanning optical system have their reflecting surfaces formed as a barrel-shaped toric surface and a toric surface, respectively, or alternatively an axisymmetric aspherical surface and a barrel-shaped toric surface, respectively. This allows proper correction of fθ characteristics and curvature of field, but makes it difficult to achieve proper correction of unevenness of the magnification in the sub-scanning-direction and groove-shaped aberration.

SUMMARY OF THE INVENTION

An object of the present invention is to provide a laser beam scanning apparatus that offers table image-formation performance which is not significantly affected by wavelength fluctuations in the light emitted from a light source and that offers excellent optical performance in terms of fθ characteristics, curvature of field, evenness of the sub-scanning-direction magnification, and groove-shaped aberration.

To achieve the above object, according to one aspect of the present invention, a scanning optical apparatus is provided with a light source for emitting a light beam, a deflector, and at least two reflecting surfaces. The deflector deflects the light beam emitted from the light source so that the light beam scans the scanned surface. Each of the two reflecting surfaces has an optical power both in the main-scanning direction and the sub-scanning direction and is not rotation-symmetric about an axis.

According to another aspect of the present invention, a laser scanning apparatus is provided with a light source for emitting a laser beam, a polygonal mirror, and at least two scanning mirrors. The polygonal mirror reflects and thereby deflects the laser beam emitted from the light source and is rotatable about a predetermined axis of rotation. The two scanning mirrors reflect the laser beam deflected by the polygonal mirror so that the laser beam is focused onto the scanned surface. The scanning mirrors each has a reflecting surface that has an optical power both in the main-scanning direction and the sub-scanning direction and that is not rotation-symmetric about an axis.

According to still another aspect of the present invention, a laser scanning apparatus is provided with a light source for emitting a laser beam, a polygonal mirror, and an imaging optical system. The polygonal mirror reflects and thereby deflects the laser beam emitted from the light source and is rotatable about a predetermined axis of rotation. The imaging optical system focuses the laser beam deflected by the polygonal mirror on the scanned surface while moving the laser beam at a substantially uniform speed across the scanned surface. The imaging optical system includes two scanning mirrors each having a reflecting surface that has an optical power both in the main-scanning direction and the sub-scanning direction and that is not rotation-symmetric about an axis.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, laser beam scanning apparatuses embodying the present invention will be described with reference to the corresponding drawings.

Embodiment 1

Figure 1:
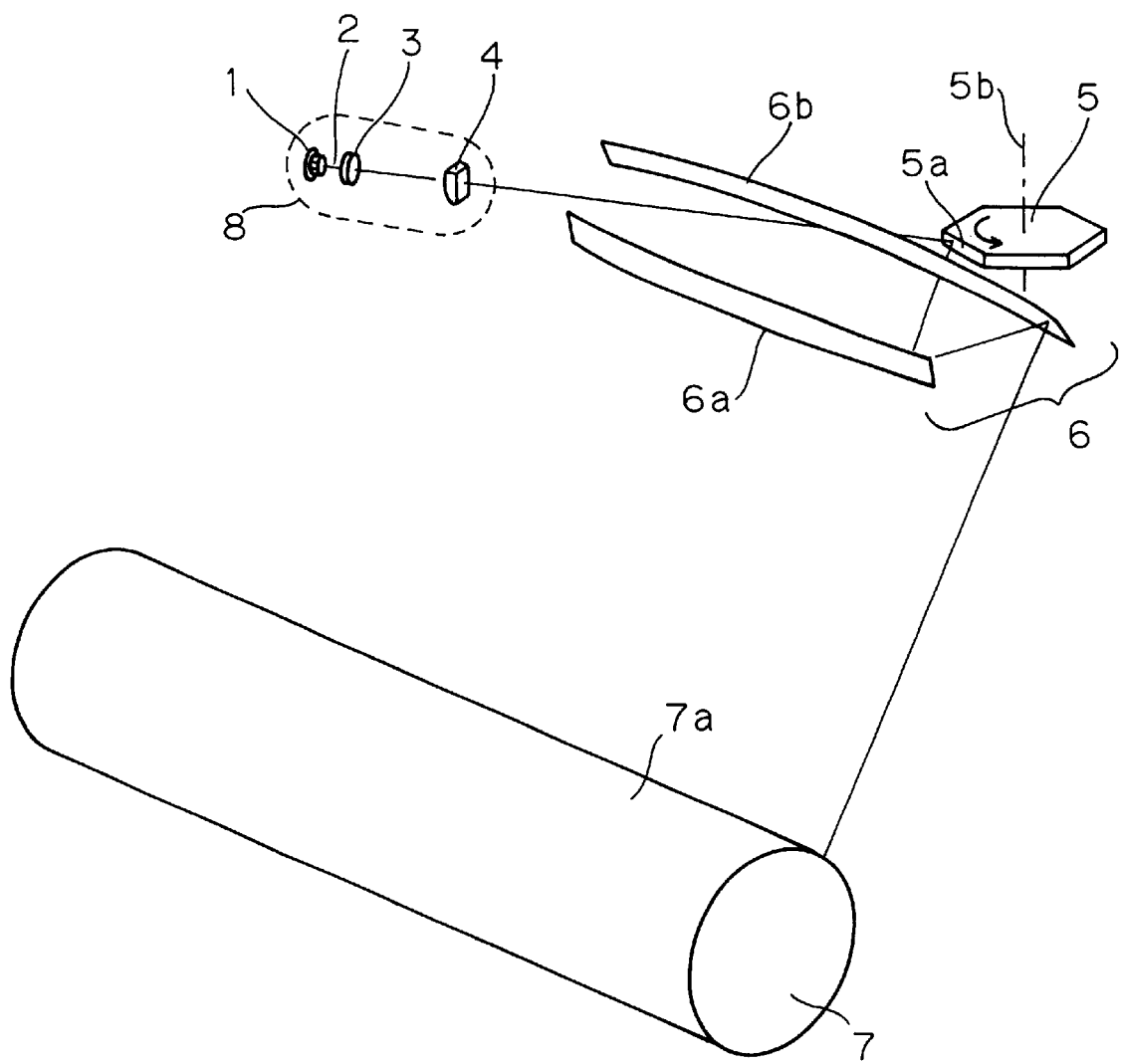
FIG. 1 is a perspective view schematically illustrating the basic structure of the laser beam scanning apparatus of a first embodiment of the present invention.

FIG. 1 is a perspective view schematically illustrating the basic structure of the laser beam scanning apparatus of a first embodiment of the present invention. As shown in this figure, a laser beam 2 emitted from a laser light source 1 passes through a collimator lens 3, is thereby formed into a parallel light beam, then passes through a cylindrical lens 4, and is thereby condensed only in the sub-scanning direction in the vicinity of one of the reflecting surfaces 5a of a polygonal mirror 5. Here, the laser light source 1, the collimator lens 3, and the cylindrical lens 4 constitute a light source block 8.

Thereafter, the laser beam is deflected by the polygonal mirror 5 that rotates about an axis of rotation 5b thereof as indicated by an arrow, is then reflected from a first and a second mirror 6a and 6b of a scanning mirror 6, and is then condensed on an image surface 7a of a photoconductive body 7 so as to form a latent image thereon. As the polygonal mirror 5 rotates, each reflecting surface 5a rotates, and this permits the laser beam 2 to scan the image surface 7a of the rotating photoconductive body 7 so as to form a latent image thereon.

Figure 2A:
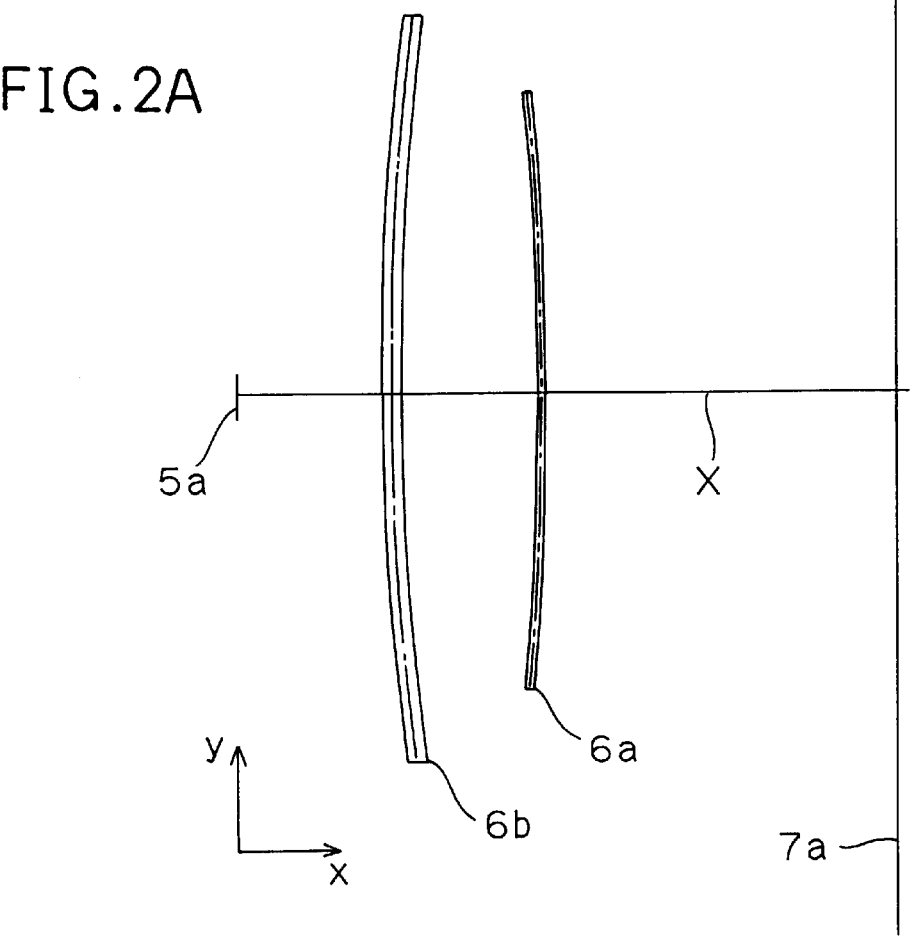
FIGS. 2A and 2B are diagrams schematically illustrating the shape of the scanning optical system employed in the first embodiment.
Figure 2B:
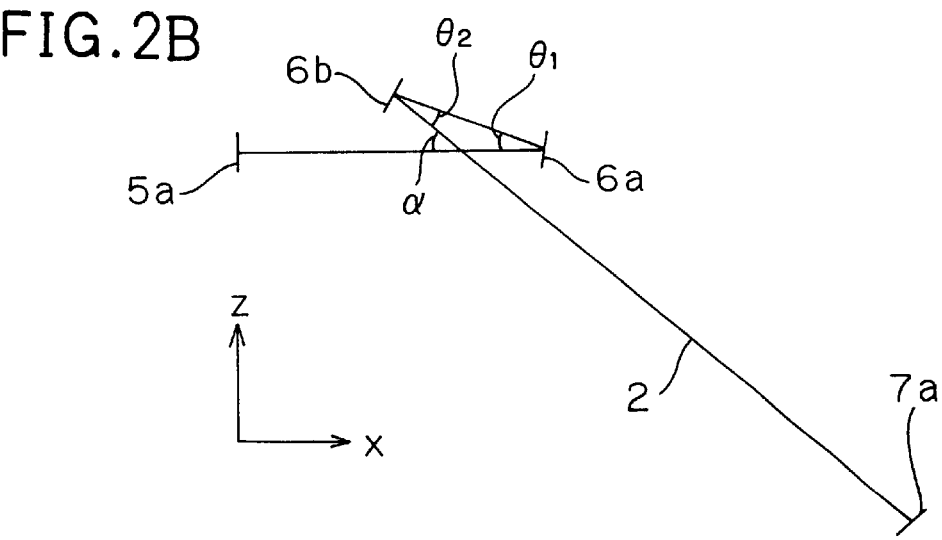

FIGS. 2A and 2B are diagrams illustrating the shape of the scanning optical system employed in the first embodiment, with FIGS. 2A and 2B showing a plan view and a side view, respectively, of the scanning optical system. As shown in these figures, here, it is assumed that the optical axis X is the x axis, the main-scanning direction is the y axis, and the sub-scanning direction is the z axis. Moreover, Table 1 lists the coordinates of the surfaces included in the scanning optical system. In Table 1, for each of the first and second mirrors 6a and 6b and the image surface 7a (the evaluation plane) of the photoconductive body 7, the position and the orientation thereof are given as the origin (i.e. the coordinates thereof) and the x-axis and y-axis vectors (i.e. the x,y,z components thereof) of the local coordinate system assumed at each surface. Note that, in this table, all lengths are given in mm.

The shapes of these surfaces are defined by the following equation:

$$x = \sum_{i=0}^{10} \sum_{j=0}^{3} a_{ij} y^i z^j$$

Note that, as described above, the coordinate system has its x axis aligned with the optical axis, has its y axis aligned with the main-scanning direction, and has its z axis aligned with the sub-scanning direction. The coefficient $a_{ij}$ used in the above equation defining the surface shape takes values as listed in Tables 2 and 3, which list, for the first and second mirrors, respectively, the values of the coefficient $a_{ij}$ of the ith order with respect to y and of the jth order with respect to z in the form of a matrix of i rows×j columns. In these tables, the symbol En (where n is an integer number) represents×$10^n$; for example, E-04 represents×$10^{-4}$.

As shown in FIG. 2B, in this embodiment, when the deflection angle in the main-scanning direction is such that exactly the center of an image is being formed, the angle $\theta_1$ that the laser beam 2 striking the first mirror 6a forms with the laser beam 2 reflected therefrom is made equal to an angle $\theta_2$ that the laser beam 2 striking the second mirror 6b forms with the laser beam 2 reflected therefrom, and the angle α that the laser beam 2 reflected from the second reflecting surface forms with the plane including the laser beam 2 striking the reflecting surface 5a of the polygonal mirror 5 and the laser beam 2 deflected thereby is twice as great as the angle $\theta_1$. That is, the following relationships hold: $\theta_1=\theta_2$, and $\theta=2\alpha_1$. The same is true also in all the embodiments described hereafter. This design helps prevent so-called wave-front aberration and prevent the scanning lines formed on the image surface 7a of the photoconductive body 7 from becoming "bow"-shaped (curved).

Figure 3A:
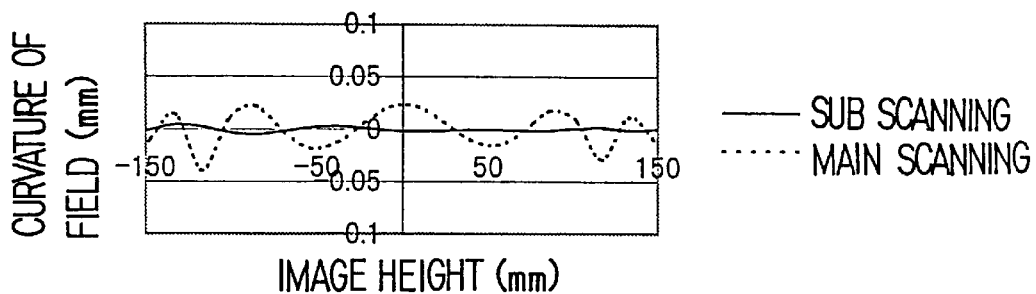
FIGS. 3A to 3D are diagrams showing the optical performance of the scanning optical system employed in the first embodiment.
Figure 3B:
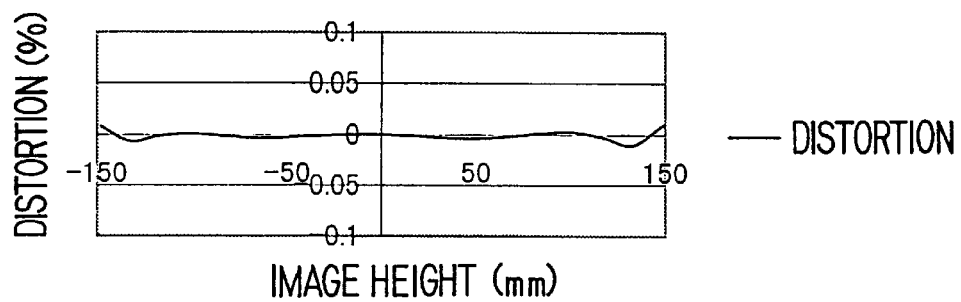
Figure 3C:
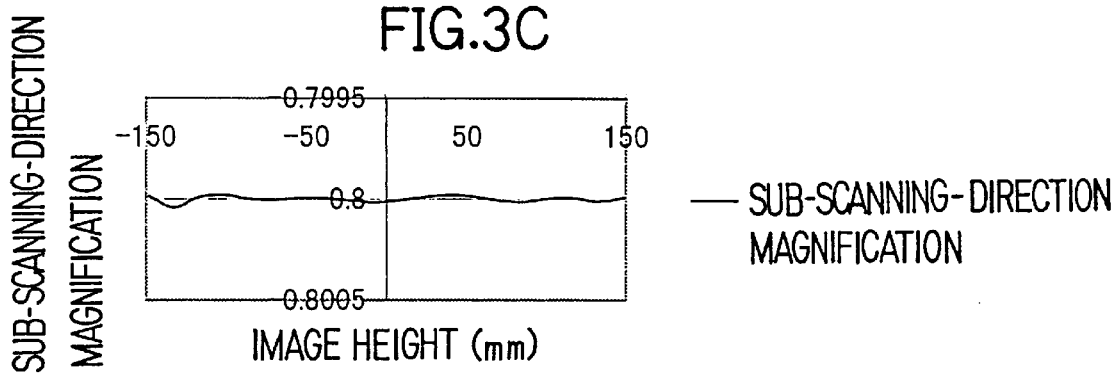
Figure 3D:
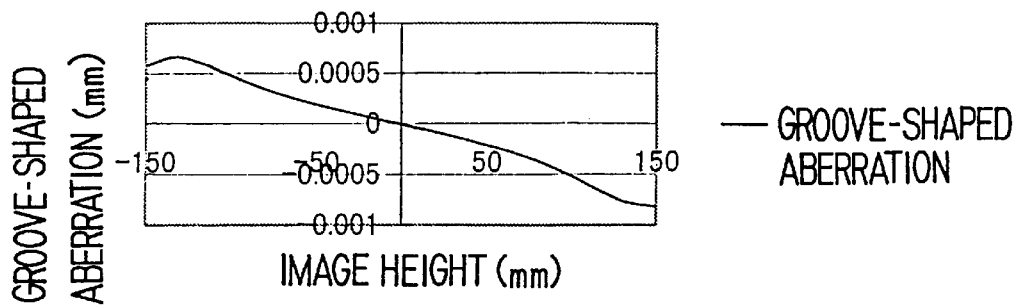

FIGS. 3A to 3D are diagrams showing the optical performance of the scanning optical system employed in the first embodiment, with FIG. 3A showing the curvature of field, FIG. 3B showing the fθ characteristics, FIG. 3C showing the sub-scanning-direction magnification, and FIG. 3D showing the groove-shaped aberration observed therein. FIG. 3A, in which the image height is taken along the horizontal axis and the curvature of field is taken along the vertical axis, shows the curvature of field observed in the sub- and main-scanning directions; FIG. 3B, in which the image height is taken along the horizontal axis and the distortion ratio is taken along the vertical axis, shows the distortion; FIG. 3C, in which the image height is taken along the horizontal axis and the sub-scanning-direction magnification is taken along the vertical axis, shows the magnification of the scanning optical system in the sub-scanning direction; and FIG. 3D, in which the image height is taken along the horizontal axis and the groove-shaped aberration is taken along the vertical axis, shows the groove-shaped aberration. From these figures, it will be seen that the scanning optical system of this embodiment offers superior optical characteristics in all of these respects. This is achieved by designing the two mirrors to have free-form surfaces (i.e. surfaces that are not rotation-symmetric about an axis).

Figure 4:
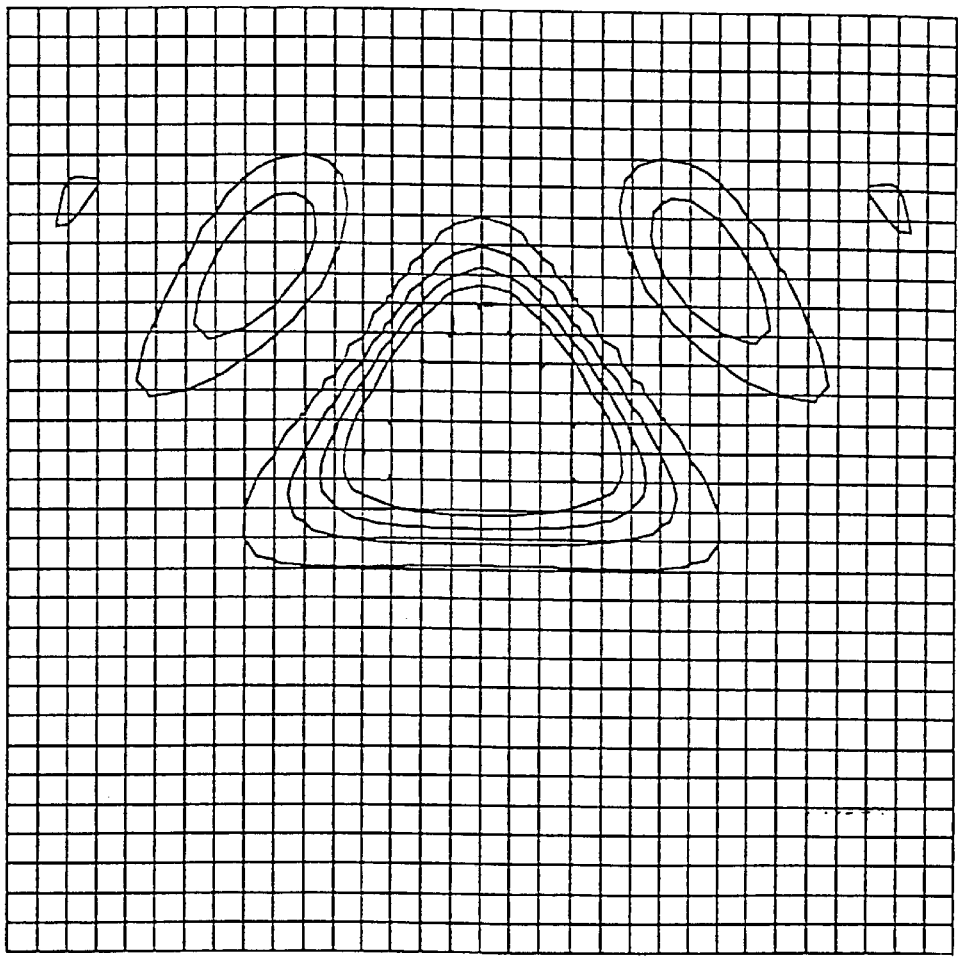
FIG. 4 is a diagram illustrating the beam spot shape as observed when groove-shaped aberration is unduly great.

If the sub-scanning-direction magnification varies with the deflection angle, the spot diameter of the laser beam varies with the position in the main-scanning direction. This causes irregularities in the image formed. Moreover, when the groove-shaped aberration is unduly great, it is impossible to condense the laser beam properly and thus it is impossible to obtain an image with satisfactory quality. FIG. 4 illustrates the beam spot shape observed when the groove-shaped aberration is unduly great. Here, the beam has a triangular section. In this case, a brighter F-number does not help make the beam diameter smaller. Accordingly, to make the beam diameter smaller, it is essential to prevent groove-shaped aberration.

Embodiment 2

Figure 5:
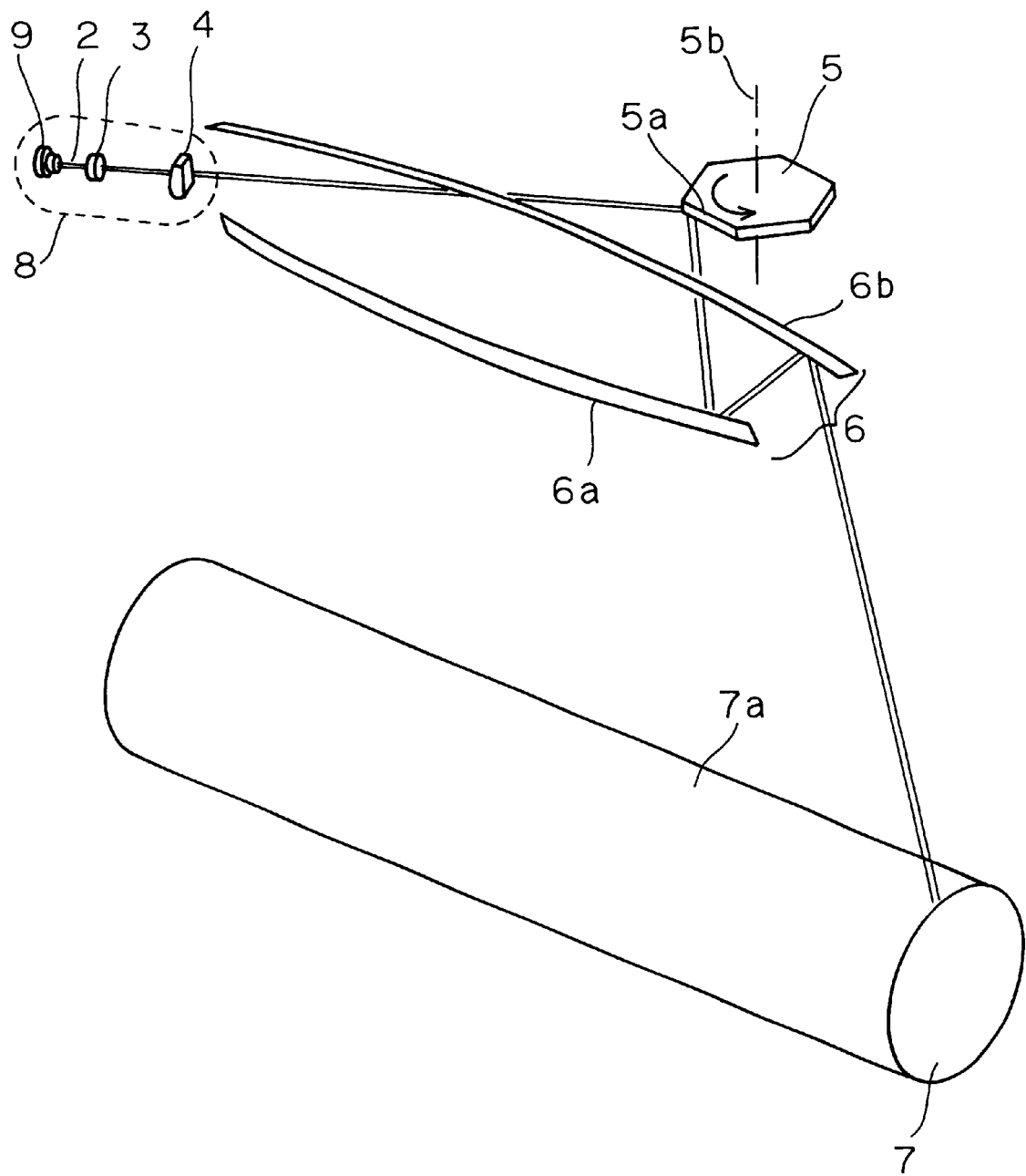
FIG. 5 is a perspective view schematically illustrating the basic structure of the laser beam scanning apparatus of a second embodiment of the present invention.

FIG. 5 is a perspective view schematically illustrating the basic structure of the laser beam scanning apparatus of a second embodiment of the present invention. As shown in this figure, a laser beam 2 emitted from a multi-beam laser light source 9 passes through a collimator lens 3, is thereby formed into a parallel light beam, then passes through a cylindrical lens 4, and is thereby condensed only in the sub-scanning direction in the vicinity of one of the reflecting surfaces 5a of a polygonal mirror 5. Here, the collimator lens 3, the cylindrical lens 4, and the multi-beam laser light source 9 constitute a light source block 8.

Thereafter, the laser beam is deflected by the polygonal mirror 5 that rotates about an axis of rotation 5b as indicated by an arrow, is then reflected from a first and a second mirror 6a and 6b of a scanning mirror 6, and is then condensed on an image surface 7a of a photoconductive body 7 so as to form a latent image thereon. As the polygonal mirror 5 rotates, each reflecting surface 5a rotates, and this permits the laser beam 2 to scan the image surface 7a of the rotating photoconductive body 7 so as to form a latent image thereon.

Figure 6A:
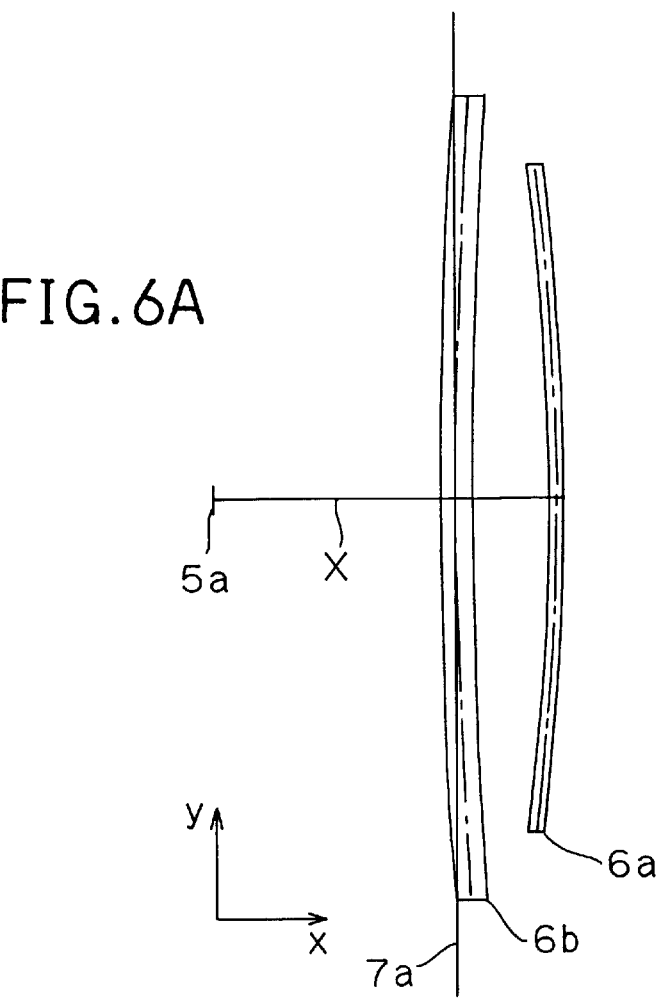
FIGS. 6A and 6B are diagrams schematically illustrating the shape of the scanning optical system employed in the second embodiment.
Figure 6B:
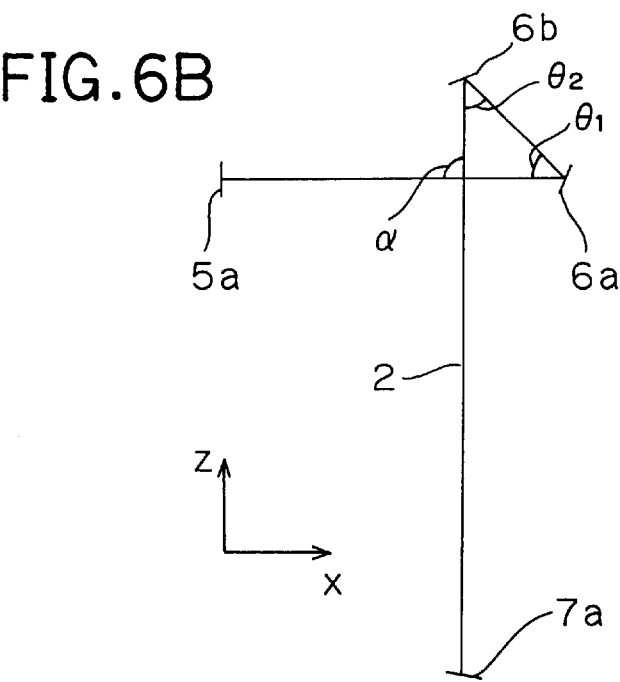

FIGS. 6A and 6B are diagrams illustrating the shape of the scanning optical system employed in the second embodiment, with FIGS. 6A and 6B showing a plan view and a side view, respectively, of the scanning optical system. As shown in these figures, here, it is assumed that the optical axis X is the x-axis, the main-scanning direction is the y-axis, and the sub scanning direction is the z-axis. Moreover, Table 4 lists the coordinates of the surfaces included in the scanning optical system. In Table 4, for each of the first and second mirrors 6a and 6b and the image plane 7a (the evaluation plane) of the photoconductive body 7, the position and the orientation thereof are given as the origin (i.e. the coordinates thereof) and the x-axis and y-axis vectors (i.e. the x,y,z components thereof) of the local coordinate system assumed at each surface. Note that, in this table, all lengths are given in mm.

Moreover, the coefficient $a_{ij}$ used in the above equation defining the surface shape takes values as listed in Tables 5 and 6, which list, for the first and second mirrors, respectively, the values of the coefficient $a_{ij}$ of the ith order with respect to y and of the jth order with respect to z in the form of a matrix of i rows×j columns. In these tables, the symbol En (where n is an integer number) represents×$10^n$; for example, E-03 represents×$10^{-3}$.

Figure 7A:
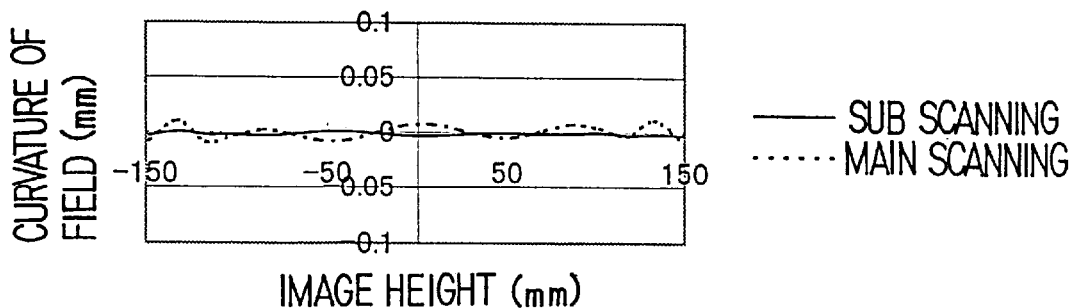
FIGS. 7A to 7D are diagrams showing the optical performance of the scanning optical system employed in the second embodiment.
Figure 7B:
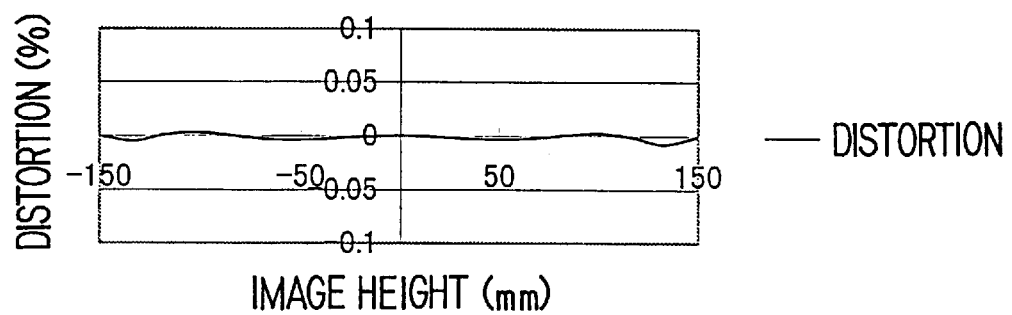
Figure 7C:
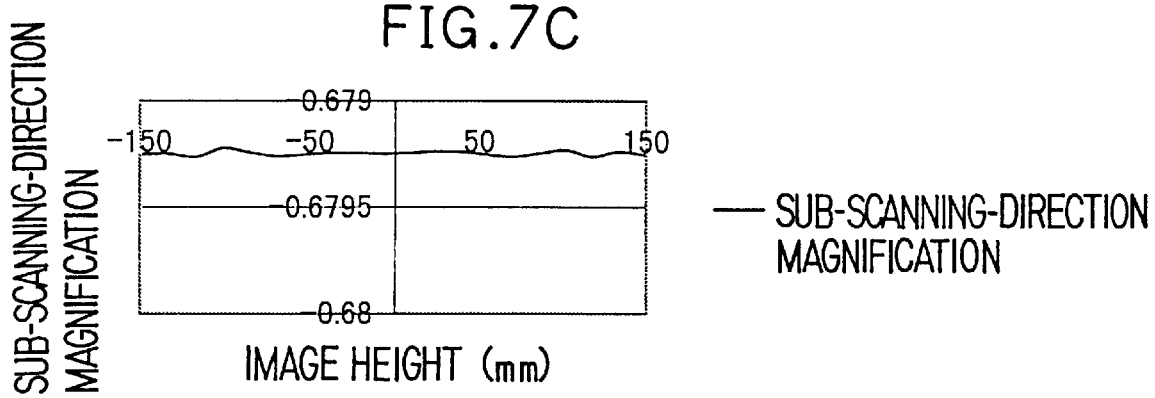
Figure 7D:
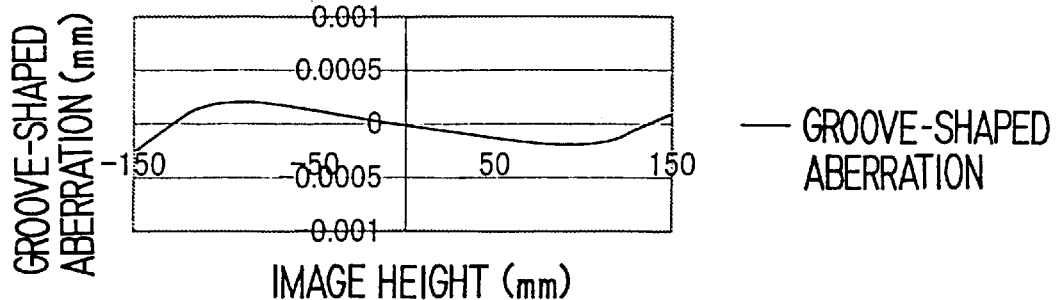

FIGS. 7A to 7D are diagrams showing the optical performance of the scanning optical system employed in the second embodiment, with FIG. 7A showing the curvature of field, FIG. 7B showing the fθ characteristics, FIG. 7C showing the sub-scanning-direction magnification, and FIG. 7D showing the groove-shaped aberration observed therein. FIG. 7A, in which the image height is taken along the horizontal axis and the curvature of field is taken along the vertical axis, shows the curvature of field observed in the sub and main-scanning directions; FIG. 7B, in which the image height is taken along the horizontal axis and the distortion ratio is taken along the vertical axis, shows the distortion; FIG. 7C, in which the image height is taken along the horizontal axis and the sub-scanning-direction magnification is taken along the vertical axis, shows the magnification of the scanning optical system in the sub-scanning direction; and FIG. 7D, in which the image height is taken along the horizontal axis and the groove-shaped aberration is taken along the vertical axis, shows the groove-shaped aberration. From these figures, it will be seen that the scanning optical system of this embodiment offers superior optical characteristics in all of these respects. This is achieved by designing the two mirrors to have free-form surfaces (i.e. surfaces that are not rotation-symmetric about an axis).

Figure 8A:
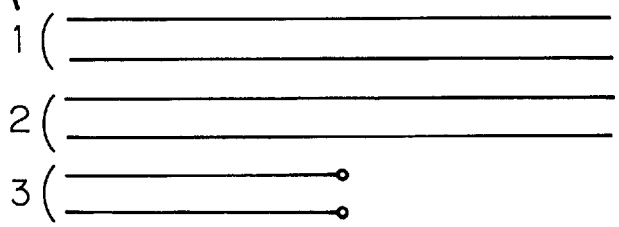
FIGS. 8A to 8C are diagrams illustrating the defects appearing in the formed image as a result of non-uniformity of the sub-scanning-direction magnification.
Figure 8B:
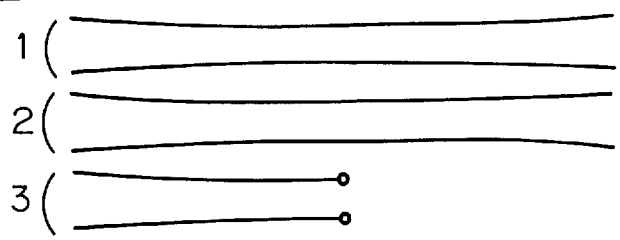
Figure 8C:
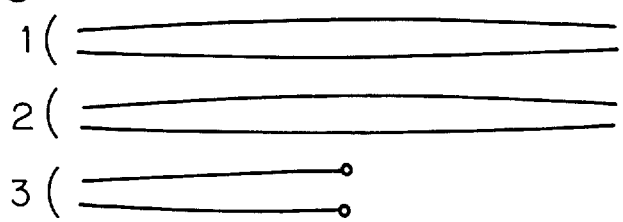

In a case where, as in this embodiment, an image is formed by a plurality of laser beams concurrently shone on a scanned surface, the characteristics of the sub-scanning-direction magnification have an additional effect other than its previously-described effect on the spot diameter of the laser beams. FIGS. 8A to 8C are diagrams illustrating the defects appearing in the formed image as a result of non-uniformity of the sub-scanning-direction magnification in a case where an image is formed by a plurality of laser beams. As shown in FIG. 8A, when the sub-scanning-direction magnification is uniform, the scanning lines (here, only three groups of scanning lines are shown for each laser beam) are formed at equal intervals, and thus it is possible to obtain an image free from irregularities.

However, in a case where the sub-scanning-direction magnification is higher in the peripheral portion of the image (in the vicinity of the right-hand and left-hand ends thereof) than in the central portion thereof, as shown in FIG. 8B, the scanning lines are more widely spaced in the peripheral portion than in the central portion. In contrast, in a case where the sub-scanning-direction magnification is lower in the peripheral portion of the image than in the central portion thereof, as shown in FIG. 8C, the scanning lines are more narrowly spaced in the peripheral portion than in the central portion. In either case, the image formed suffers from irregularities.

Figure 9A:
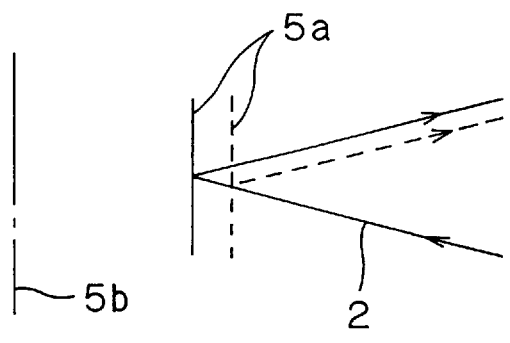
FIGS. 9A and 9B are diagrams illustrating the problem that arises when a light beam strikes the polygonal mirror at an inappropriate angle.
Figure 9B:
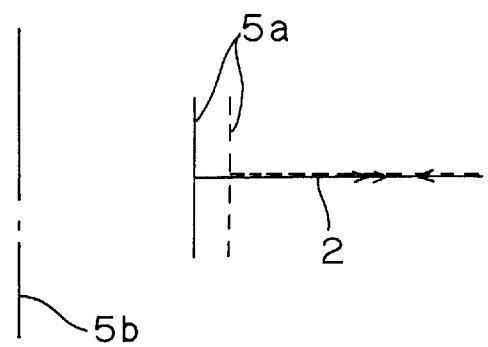

Incidentally, in all of the embodiments of the invention, the light emitted from the light source takes a path within a plane perpendicular to the axis of rotation 5b of the polygonal mirror 5, then strikes the polygonal mirror 5 so as to be deflected by one of the reflecting surfaces 5a thereof, and then travels therefrom back through the same plane. FIGS. 9A and 9B are diagrams illustrating the problem which arises when the light emitted from the light source strikes the polygonal mirror if the light beam does not travel within a plane perpendicular to the axis of rotation of the polygonal mirror. A polygonal mirror has a plurality of reflecting surfaces. In a polygonal mirror, due to manufacturing errors, the distances from the axis of rotation to the individual reflecting surfaces are subtly different from one another.

In a case as shown in FIG. 9A where, as indicated by a solid-line arrow, the laser beam 2 is obliquely incident on the reflecting surfaces 5a without traveling within the plane perpendicular to the axis of rotation 5b of the polygonal mirror 5, the following problem arises. As indicated by solid and broken lines, the individual reflecting surfaces 5a are located at different distances from the axis of rotation 5b. Thus, depending on by which one of the reflecting surfaces the laser beam is deflected, the deflected laser beam 2 travels at different heights as indicated by solid- and broken-line arrows. This variation of the height of the laser beam 2 appears, as a result of the imaging action of the scanning optical system, as the variation of the beam imaging position in the sub-scanning direction on the image surface of the photoconductive body 7.

Since an image is formed continuously while the reflecting surfaces 5a of the polygonal mirror 5 are switched from one to the next, if this switching causes the beam imaging position to vary in the sub-scanning direction, it is inevitable that the scanning lines are formed at uneven intervals on the image. By contrast, as shown in FIG. 9B, if the laser beam 2 striking the polygonal mirror 5 is allowed to travel within a plane perpendicular to the axis of rotation 5b of the polygonal mirror 5 as indicated by solid-line arrows, even if the individual reflecting surfaces 5a are located at different distances from the axis of rotation 5b as indicated by solid and broken lines and by whichever reflecting surface 5a the laser beam may be deflected, it never occurs that the deflected laser beam 2 travels at different heights as indicated by solid- and broken-line arrows, and thus it never occurs that the intervals between the scanning lines vary.

Figure 10:
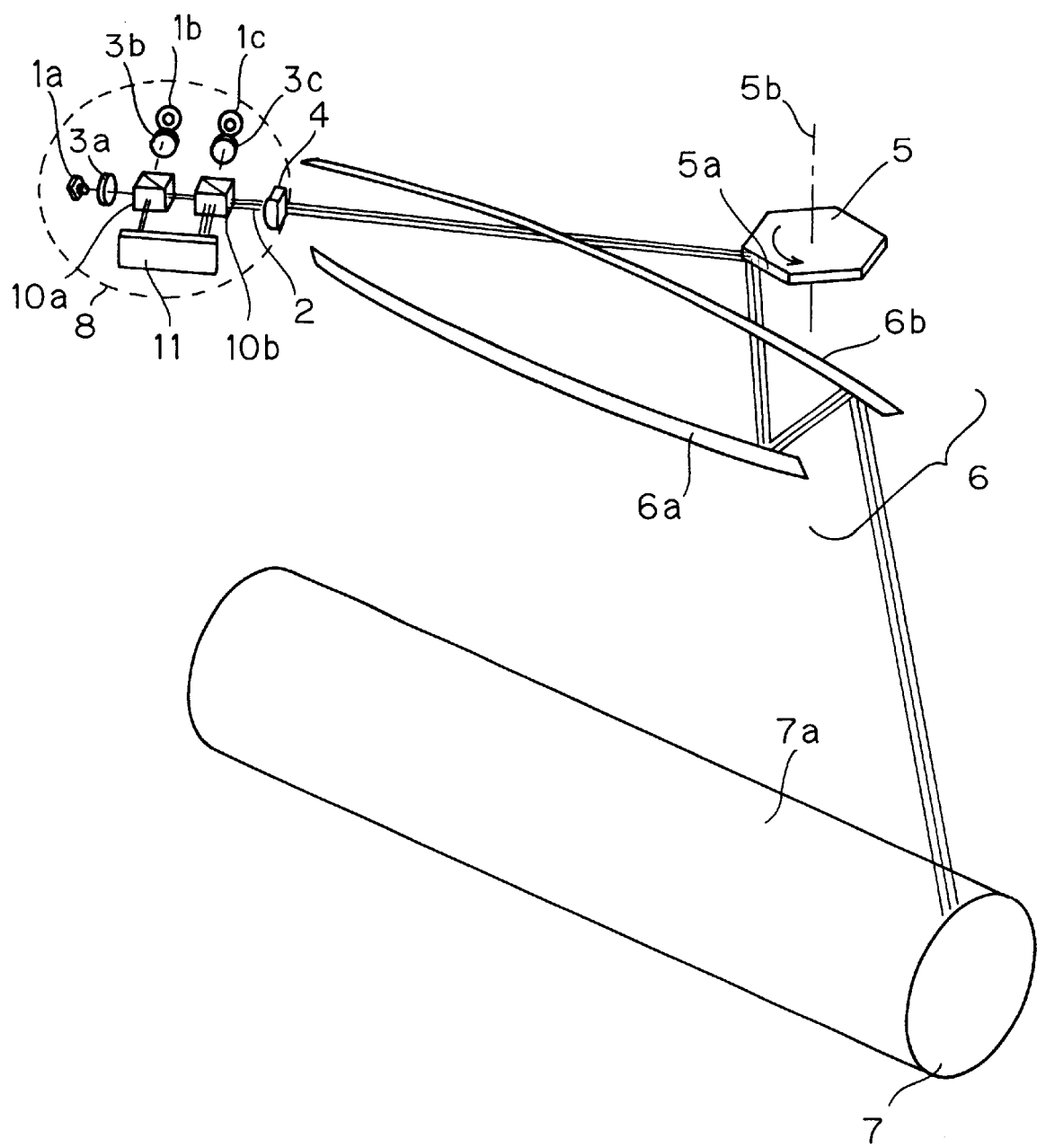
FIG. 10 is a perspective view schematically illustrating the basic structure of the laser beam scanning apparatus of a third embodiment of the present invention.

FIG. 10 is a perspective view schematically illustrating the basic structure of the laser beam scanning apparatus of a third embodiment of the present invention. The laser beam scanning apparatus of this embodiment has the same basic structure as that of the second embodiment described above, except for the construction of the light source block 8. As shown in this figure, laser beams 2a to 2c emitted individually from laser light sources 1a to 1c pass through collimator lenses 3a to 3c, respectively, are thereby formed into parallel light beams, and are then subjected to separation and integration by beam splitters 10a and 10b.

Of the laser beams separated by the beam splitters, some are intercepted by a light-shielding member 11, whereas others are integrated into a laser beam 2, which is used to perform image formation. The laser beam 2 passes through a cylindrical lens 4, and is thereby condensed only in the sub-scanning direction in the vicinity of one of the reflecting surfaces 5a of a polygonal mirror 5. Note that the laser light sources 1a to 1c, the collimator lenses 3a to 3c, the cylindrical lens 4, and the beam splitters 10a and 10b constitute the light source block 8.

Thereafter, the laser beam 2 is deflected by the polygonal mirror 5 that rotates about an axis of rotation 5b as indicated by an arrow, is then reflected from a first and a second mirror 6a and 6b of a scanning mirror 6, and is then condensed on an image surface 7a of a photoconductive body 7 so as to form a latent image thereon. As the polygonal mirror 5 rotates, each reflecting surface 5a rotates, and this permits the laser beam 2 to scan the image plane 7a of the rotating photoconductive body 7 so as to form a latent image thereon.

Figure 11:
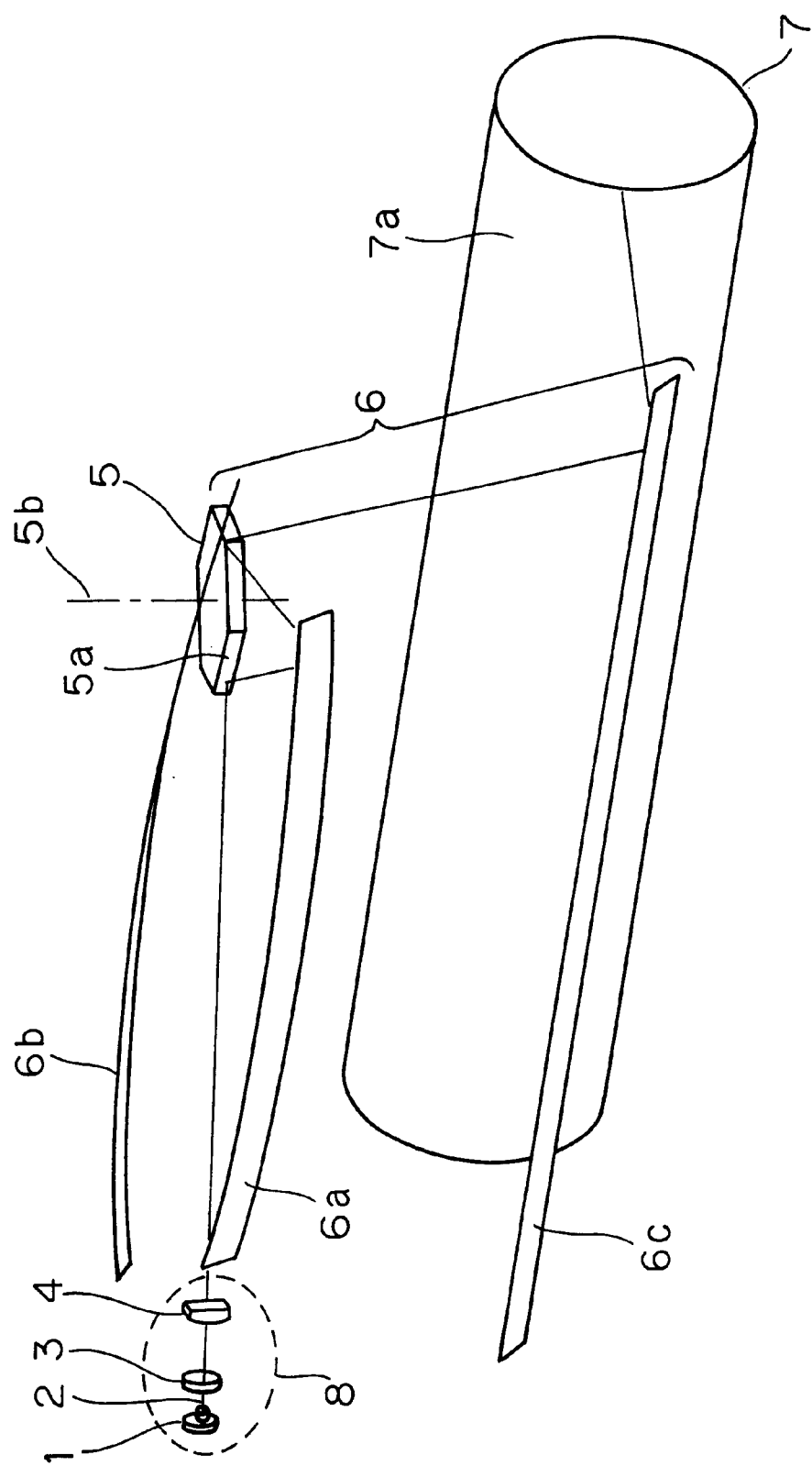
FIG. 11 is a perspective view schematically illustrating the basic structure of the laser beam scanning apparatus of a fourth embodiment of the present invention.

FIG. 11 is a perspective view schematically illustrating the basic structure of the laser beam scanning apparatus of a fourth embodiment of the present invention. The laser beam scanning apparatus of this embodiment has the same basic structure as that of the first embodiment described above, except that the scanning optical system is composed of three mirrors. As shown in this figure, a laser beam 2 emitted from a laser light source 1 passes through a collimator lens 3, is thereby formed into a parallel light beam, then passes through a cylindrical lens 4, and is thereby condensed only in the sub-scanning direction in the vicinity of one of the reflecting surfaces 5a of a polygonal mirror 5. Note that the laser light source 1, the collimator lens 3, and the cylindrical lens 4 constitute a light source block 8.

Thereafter, the laser beam 2 is deflected by the polygonal mirror 5 that rotates about an axis of rotation 5b as indicated by an arrow, is then reflected from a first, a second, and a third mirror 6a, 6b, and 6c of a scanning mirror 6, and is then condensed on an image surface 7a of a photoconductive body 7 so as to form a latent image thereon. As the polygonal mirror 5 rotates, each reflecting surface 5a rotats, and this permits the laser beam 2 to scan the image surface 7a of the rotating photoconductive body 7 so as to form a latent image thereon.

Figure 12A:
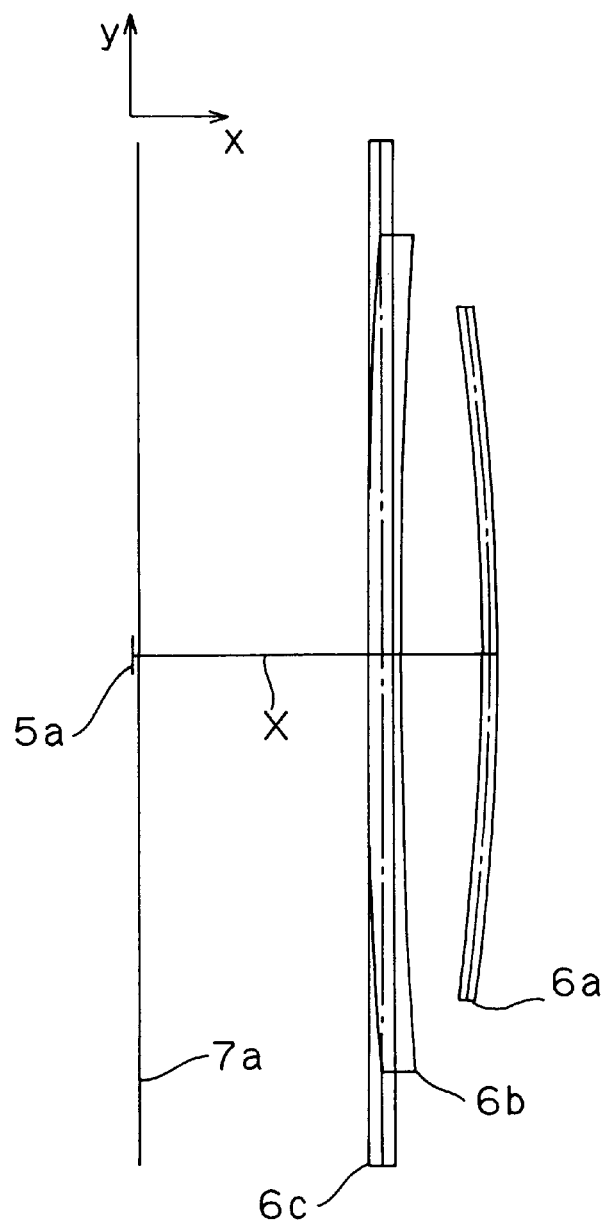
FIGS. 12A and 12B are diagrams schematically illustrating the shape of the scanning optical system employed in the fourth embodiment.
Figure 12B:
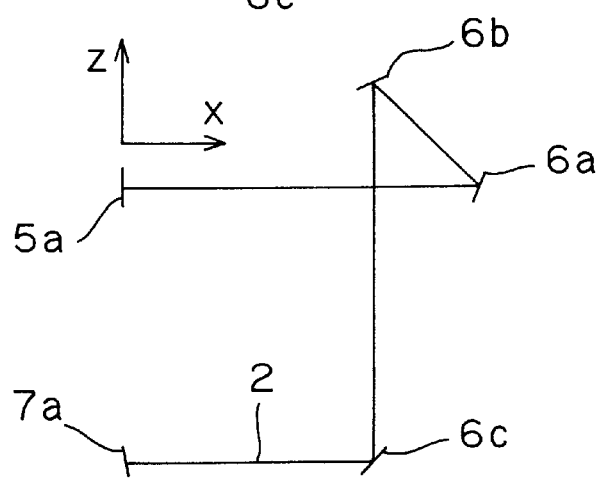

FIGS. 12A and 12B are diagrams illustrating the shape of the scanning optical system employed in the fourth embodiment, with FIGS. 12A and 12B showing a plan view and a side view, respectively, of the scanning optical system. As shown in these figures, here, it is assumed that the optical axis X is the x-axis, the main-scanning direction is the y-axis; and the sub-scanning direction is the z-axis. Moreover, Table 7 lists the coordinates of the surfaces included in the scanning optical system. In Table 7, for each of the first, second, and third mirrors 6a to 6c and the image surface 7a (the evaluation plane) of the photoconductive body 7, the position and the orientation thereof are given as the origin (i.e. the coordinates thereof) and the x-axis and y-axis vectors (i.e. the x,y,z components thereof) of the local coordinate system assumed at each surface. Note that, in this table, all lengths are given in mm.

Moreover, the coefficient $a_{ij}$ used in the above equation defining the surface shape takes values as listed in Tables 8 and 9, which list, for the first and second mirrors, respectively, the values of the coefficient $a_{ij}$ of the ith order with respect to y and of the jth order with respect to z in the form of a matrix of i rows×j columns. In these tables, the symbol En (where n is an integer number) represents×$10^n$; for example, E-06 represents×$10^{-6}$.

Moreover, Table 10 lists the curvatures of the third mirror as observed individually in the main- and sub-scanning directions. As shown in Table 10, the third mirror has a cylindrical surface.

Figure 13A:
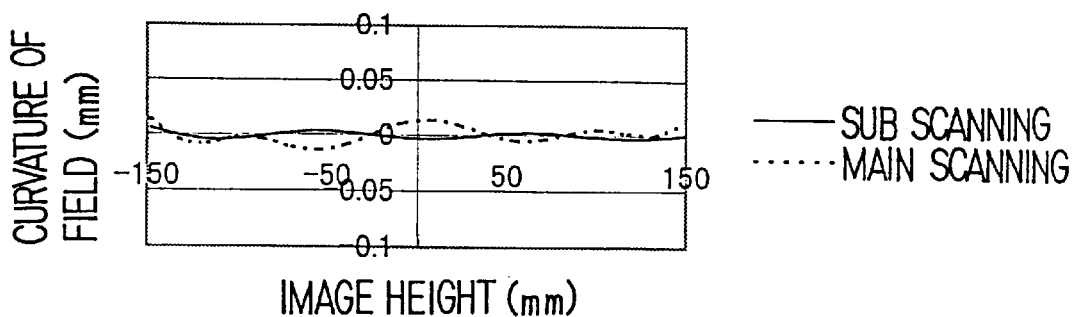
FIGS. 13A to 13D are diagrams showing the optical performance of the scanning optical system employed in the fourth embodiment.
Figure 13B:
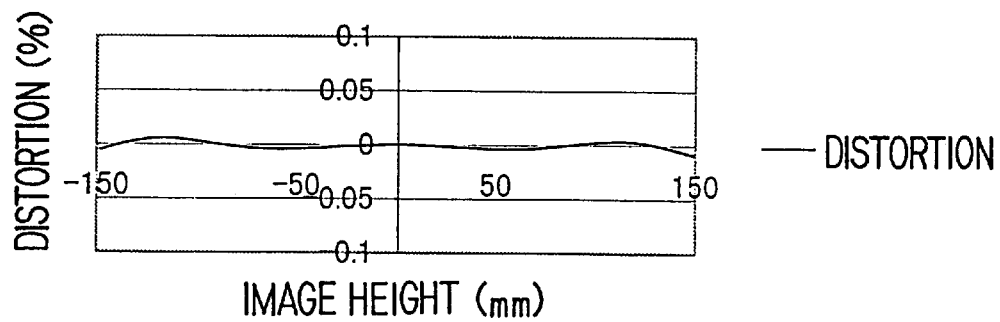
Figure 13C:
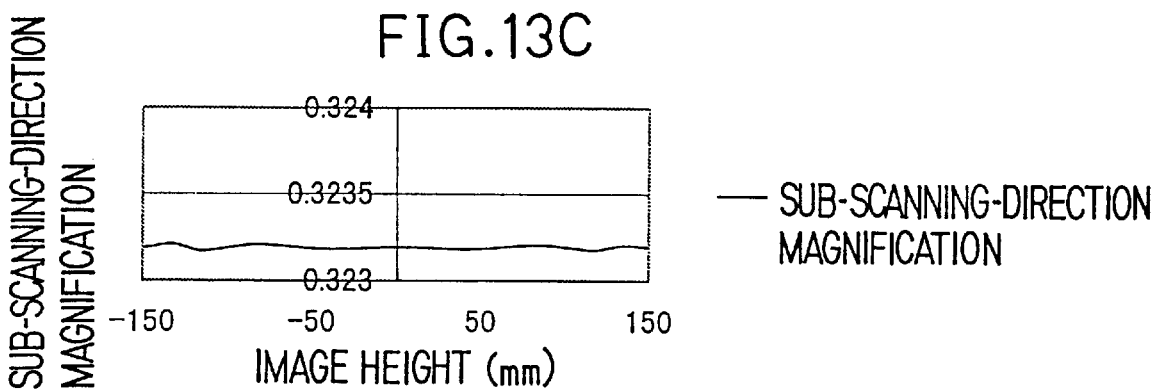
Figure 13D:
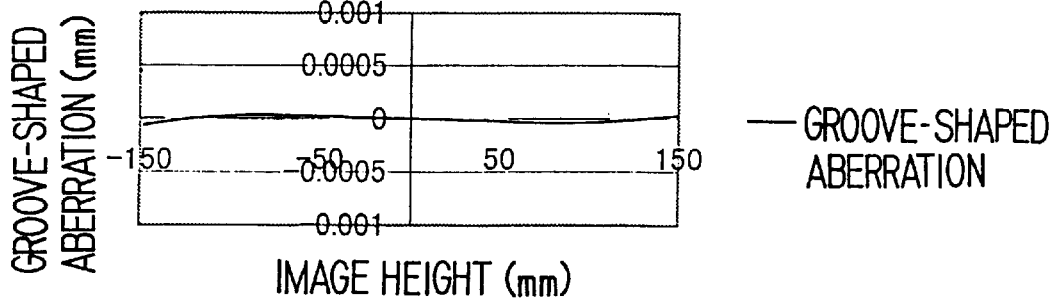

FIGS. 13A to 13D are diagrams showing the optical performance of the scanning optical system employed in the fourth embodiment, with FIG. 13A showing the curvature of field, FIG. 13B showing the fθ characteristics, FIG. 13C showing the sub-scanning-direction magnification, and FIG. 13D showing the groove-shaped aberration observed therein. FIG. 13A, in which the image height is taken along the horizontal axis and the curvature of field is taken along the vertical axis, shows the curvature of field observed in the sub and main-scanning directions; FIG. 13B, in which the image height is taken along the horizontal axis and the distortion ratio is taken along the vertical axis, shows the distortion; FIG. 13C, in which the image height is taken along the horizontal axis and the sub-scanning-direction magnification is taken along the vertical axis, shows the magnification of the scanning optical system in the sub-scanning direction; and FIG. 13D, in which the image height is taken along the horizontal axis and the groove-shaped aberration is taken along the vertical axis, shows the groove-shaped aberration. From these figures, it will be seen that this embodiment offers superior optical characteristics in all of these respects. This is achieved by designing two of the mirrors to have free-form surfaces (i.e. surfaces that are not rotation-symmetric about an axis).

Moreover, even if a scanning optical system includes, in addition to two free-form mirrors, another surface having an optical power, like the third mirror of this embodiment, by giving those two free-form surfaces appropriate shapes, it is possible to satisfactorily suppress aberrations as mentioned above in the scanning optical system. In this embodiment, the third mirror has a cylindrical surface; however, forming this surface as a free-form surface makes no particular difference in terms of design.

It is to be understood that the light source recited in the appended claims of the invention corresponds to the light source block employed in the above-described embodiments; similarly, the deflector corresponds to the polygonal mirror; the scanned surface corresponds to the image plane of the photoconductive body; the reflecting surfaces corresponds to the scanning mirrors; the light source member corresponds to the laser light source; and the integrating means corresponds to the beam splitter.

TABLE 1

|  |  | X component | Y component | Z component |
| --- | --- | --- | --- | --- |
| First Mirror | Position | 80.00 | 0.00 | 0.00 |
|  | X direction | 0.9848 | 0.0000 | −0.1736 |
|  | Y direction | 0.0000 | 1.0000 | 0.0000 |
| Second Mirror | Position | 40.00 | 0.00 | 14.56 |
|  | X direction | −0.8660 | 0.0000 | 0.5000 |
|  | Y direction | 0.0000 | 1.0000 | 0.0000 |
| Evaluation Plane | Position | 176.84 | 0.00 | −100.27 |
|  | X direction | 0.6428 | 0.0000 | −0.7660 |
|  | Y direction | 0.0000 | 1.0000 | 0.0000 |

TABLE 2

| Y\Z | 0 | 1 | 2 | 3 |
|---|---|---|---|---|
| 0 | 0.0000000E+00 | 0.0000000E+00 | 7.2504087E−03 | 0.0000000E+00 |
| 1 | 9.3686797E−04 | −3.6167913E−06 | −1.8875731E−06 | 0.0000000E+00 |
| 2 | −7.0374748E−04 | 5.3481194E−06 | −1.7197967E−07 | 0.0000000E+00 |
| 3 | −2.8187814E−07 | −4.2900237E−09 | 2.9400726E−10 | 0.0000000E+00 |
| 4 | 3.2936382E−08 | 1.6905625E−10 | −1.4744384E−11 | 0.0000000E+00 |
| 5 | 4.3695725E−11 | 8.3804655E−13 | −3.3182288E−14 | 0.0000000E+00 |
| 6 | −2.6210201E−12 | −1.9286866E−14 | 2.2588476E−15 | 0.0000000E+00 |
| 7 | −3.2091130E−15 | −8.1278272E−17 | 0.0000000E+00 | 0.0000000E+00 |
| 8 | 2.1345877E−16 | 2.3940908E−18 | 0.0000000E+00 | 0.0000000E+00 |
| 9 | 9.0062179E−20 | 5.0098431E−21 | 0.0000000E+00 | 0.0000000E+00 |
| 10 | −1.2291845E−20 | −5.7780264E−22 | 0.0000000E+00 | 0.0000000E+00 |

TABLE 3

| Y\Z | 0 | 1 | 2 | 3 |
|---|---|---|---|---|
| 0 | 0.0000000E+00 | 0.0000000E+00 | −5.0774704E−03 | 5.7542617E−06 |
| 1 | 0.0000000E+00 | −1.5215725E−06 | 2.2186618E−07 | −1.4214516E−09 |
| 2 | −6.2246663E−04 | 1.7769806E−06 | −2.4697903E−08 | 1.3620250E−10 |
| 3 | 1.5925456E−07 | −8.7488703E−10 | 2.8926220E−12 | 2.0614702E−13 |
| 4 | −1.4414088E−08 | 8.5960069E−11 | −1.4005197E−13 | 2.6985969E−14 |
| 5 | −1.2928784E−11 | 1.3214736E−13 | −4.7554630E−16 | −3.4703881E−17 |
| 6 | 7.0371366E−13 | −7.3824112E−15 | 5.4604545E−17 | −1.4781282E−18 |
| 7 | 3.9038254E−16 | −1.0998341E−17 | 3.9287254E−20 | 0.0000000E+00 |
| 8 | −3.7593386E−17 | 1.1137921E−18 | −1.2268974E−20 | 0.0000000E+00 |
| 9 | −2.6177227E−22 | 5.0562736E−22 | 2.0771270E−24 | 0.0000000E+00 |
| 10 | 1.3615373E−21 | −7.4286408E−23 | 7.2687379E−25 | 0.0000000E+00 |

TABLE 4

| | | X component | Y component | Z component |
|---|---|---|---|---|
| First Mirror | Position | 101.21 | 0.00 | 0.00 |
| | X direction | 0.9239 | 0.0000 | −0.3827 |
| | Y direction | 0.0000 | 1.0000 | 0.0000 |
| Second Mirror | Position | 71.21 | 0.00 | 30.00 |
| | X direction | −0.3827 | 0.0000 | 0.9239 |
| | Y direction | 0.0000 | 1.0000 | 0.0000 |
| Evaluation Plane | Position | 71.21 | 0.00 | −148.47 |
| | X direction | −0.1736 | 0.0000 | −0.9848 |
| | Y direction | 0.0000 | 1.0000 | 0.0000 |

TABLE 5

| Y\Z | 0 | 1 | 2 | 3 |
|---|---|---|---|---|
| 0 | 0.0000000E+00 | 0.0000000E+00 | 6.4071688E−03 | 0.0000000E+00 |
| 1 | 1.0168389E−03 | −1.6265537E−06 | −8.8477201E−07 | 0.0000000E+00 |
| 2 | −7.5859624E−04 | 8.8620069E−06 | −1.2900744E−07 | 0.0000000E+00 |
| 3 | −1.4590196E−07 | −4.9674578E−09 | 4.4202849E−11 | 0.0000000E+00 |
| 4 | 1.1814318E−08 | 6.2068137E−11 | 4.0036605E−12 | 0.0000000E+00 |
| 5 | 1.3106476E−11 | 7.3459433E−13 | −5.3836451E−15 | 0.0000000E+00 |
| 6 | −6.8810738E−13 | −5.4764074E−14 | 2.6600859E−17 | 0.0000000E+00 |
| 7 | −5.2885078E−16 | −5.8675357E−17 | 0.0000000E+00 | 0.0000000E+00 |
| 8 | 3.8912986E−17 | 6.2580354E−18 | 0.0000000E+00 | 0.0000000E+00 |
| 9 | 9.4865732E−21 | 2.0012188E−21 | 0.0000000E+00 | 0.0000000E+00 |
| 10 | −1.5833425E−21 | −2.4157581E−22 | 0.0000000E+00 | 0.0000000E+00 |

TABLE 6

| Y\Z | 0 | 1 | 2 | 3 |
|---|---|---|---|---|
| 0 | 0.0000000E+00 | 0.0000000E+00 | −4.6355920E−03 | 1.1180484E−05 |
| 1 | 0.0000000E+00 | −2.1263607E−06 | 1.5037872E−07 | −8.1241143E−10 |
| 2 | −6.5488438E−04 | 3.4672222E−06 | −3.4542978E−08 | 3.6218613E−10 |
| 3 | 9.8122563E−08 | −1.0776506E−09 | 1.1363029E−11 | −1.8918243E−13 |
| 4 | −4.6228194E−09 | 7.7266452E−11 | −1.0420140E−12 | 5.0867363E−15 |
| 5 | −5.6811068E−12 | 9.2315710E−14 | −8.9443530E−16 | −4.7553965E−18 |
| 6 | 2.4845570E−13 | −7.4591002E−15 | 9.3594142E−17 | 4.4462316E−19 |
| 7 | 1.1916484E−16 | −3.1191648E−18 | 6.4586913E−20 | 0.0000000E+00 |
| 8 | −1.3331050E−17 | 4.9141428E−19 | −9.3105415E−21 | 0.0000000E+00 |
| 9 | −7.7329309E−22 | 3.6594138E−23 | −3.3301630E−25 | 0.0000000E+00 |
| 10 | 4.6991459E−22 | −1.2802787E−23 | 2.6136339E−25 | 0.0000000E+00 |

TABLE 7

| | | X component | Y component | Z component |
|---|---|---|---|---|
| First Mirror | Position | 101.27 | 0.00 | 0.00 |
| | X direction | 0.9239 | 0.0000 | −0.3827 |
| | Y direction | 0.0000 | 1.0000 | 0.0000 |
| Second Mirror | Position | 71.27 | 0.00 | 30.00 |
| | X direction | −0.3827 | 0.0000 | 0.9239 |
| | Y direction | 0.0000 | 1.0000 | 0.0000 |
| Third Mirror | Position | 71.27 | 0.00 | −77.55 |
| | X direction | 0.7071 | 0.0000 | −0.7071 |
| | Y direction | 0.0000 | 1.0000 | 0.0000 |
| Evaluation Plane | Position | 1.27 | 0.00 | −77.55 |
| | X direction | −0.9848 | 0.0000 | −0.1736 |
| | Y direction | 0.0000 | 1.0000 | 0.0000 |

TABLE 8

| Y\Z | 0 | 1 | 2 | 3 |
|---|---|---|---|---|
| 0 | 0.0000000E+00 | 0.0000000E+00 | 4.1553254E−03 | 0.0000000E+00 |
| 1 | 1.0887801E−03 | −9.4916739E−06 | −8.6325515E−07 | 0.0000000E+00 |
| 2 | −7.8755732E−04 | 6.2487936E−06 | −1.0023569E−07 | 0.0000000E+00 |
| 3 | −1.4609144E−07 | −1.0435209E−09 | 6.5364538E−11 | 0.0000000E+00 |
| 4 | 1.1577523E−08 | 1.6655613E−11 | 3.3930717E−12 | 0.0000000E+00 |
| 5 | 1.4312053E−11 | 3.4516813E−13 | −4.8079815E−15 | 0.0000000E+00 |
| 6 | −6.7666746E−13 | −3.7816032E−14 | −6.2306620E−17 | 0.0000000E+00 |
| 7 | −6.3449894E−16 | −3.9217705E−17 | 0.0000000E+00 | 0.0000000E+00 |
| 8 | 3.1287494E−17 | 4.0601822E−18 | 0.0000000E+00 | 0.0000000E+00 |
| 9 | 1.1943064E−20 | 1.2357036E−21 | 0.0000000E+00 | 0.0000000E+00 |
| 10 | −8.2619757E−22 | −1.2141706E−22 | 0.0000000E+00 | 0.0000000E+00 |

TABLE 9

| Y\Z | 0 | 1 | 2 | 3 |
|---|---|---|---|---|
| 0 | 0.0000000E+00 | 0.0000000E+00 | −2.9742141E−03 | −1.0772440E−05 |
| 1 | 0.0000000E+00 | −5.0424412E−06 | 1.9555253E−07 | −2.3995425E−09 |
| 2 | −6.2522781E−04 | 2.3764954E−06 | 5.7132574E−09 | −1.1335522E−10 |
| 3 | 9.8137420E−08 | −4.6100564E−10 | 2.9415572E−12 | 4.0051260E−13 |
| 4 | −4.8318310E−09 | 5.2601628E−11 | −5.9702889E−13 | −1.9992977E−14 |
| 5 | −5.8608033E−12 | 9.2374188E−14 | −1.5565316E−15 | −3.4121026E−17 |
| 6 | 2.3809408E−13 | −7.5366263E−15 | 1.5489329E−16 | 1.5003044E−18 |
| 7 | 1.2223728E−16 | −4.3341080E−18 | 1.5007334E−19 | 0.0000000E+00 |
| 8 | −8.7456840E−18 | 3.5276809E−19 | −1.1193171E−20 | 0.0000000E+00 |

TABLE 9-continued

| Y\Z | 0 | 1 | 2 | 3 |
|---|---|---|---|---|
| 9 | −7.5931435E−22 | 2.0827817E−24 | −1.5906218E−24 | 0.0000000E+00 |
| 10 | 2.2007528E−22 | −2.2853070E−24 | 1.5852702E−25 | 0.0000000E+00 |

TABLE 10

| | Main Scanning | Sub Scanning |
|---|---|---|
| Curvature | 0 | −0.005 |

What is claimed is:

1. A scanning optical apparatus comprising:
a light source for emitting a light beam;
a deflector for deflecting the light beam emitted from the light source so that the light beam scans a scanned surface; and
at least two reflecting surfaces, of which each has an optical power both in a main-scanning direction and a sub-scanning direction, and of which neither is rotation-symmetric about an axis.

2. A scanning optical apparatus as claimed in claim 1, wherein the light source emits a plurality of light beams.

3. A scanning optical apparatus as claimed in claim 2, wherein the light source emits a plurality of light beams concurrently.

4. A scanning optical apparatus as claimed in claim 2, wherein the light source comprises:
a plurality of light source members each emitting a single light beam; and
integrating means for integrating together the light beams emitted from the light source members.

5. A scanning optical apparatus as claimed in claim 2, wherein the light source comprises:
a light source member for emitting a plurality of light beams.

6. A scanning optical apparatus as claimed in claim 1, wherein a plane including the light beam striking the deflector and the light beam deflected by the deflector remains in a fixed position regardless of an angle at which the light beam is deflected.

7. A scanning optical apparatus as claimed in claim 1, wherein, when a deflection angle in the main-scanning direction is such that a center of an image is being formed, an angle that the light beam striking a first reflecting surface of the two reflecting surfaces forms with the light beam reflected therefrom is equal to an angle that the light beam striking a second reflecting surface of the two reflecting surfaces forms with the light beam reflected therefrom, and wherein an angle that the light beam reflected from the second reflecting surface forms with a plane including the light beam striking the deflector and the light beam deflected by the deflector is twice as great as the angle that the light beam entering the first reflecting surface forms with the light beam reflected therefrom.

8. A scanning optical apparatus as claimed in claim 1, wherein the deflector is a polygonal mirror that rotates about a predetermined axis of rotation.

9. A laser scanning apparatus comprising: a light source for emitting a laser beam;
a polygonal mirror for reflecting and thereby deflecting the laser beam emitted from the light source, the polygonal mirror being rotatable about a predetermined axis of rotation; and
at least two scanning mirrors for reflecting the laser beam deflected by the polygonal mirror so that the laser beam is focused onto a scanned surface, the scanning mirrors each having a reflecting surface that has an optical power both in a main-scanning direction and a sub-scanning direction and neither is rotation-symmetric about an axis.

10. A laser scanning apparatus as claimed in claim 9, wherein the light source emits a plurality of laser beams.

11. A laser scanning apparatus as claimed in claim 10, wherein the light source emits a plurality of laser beams concurrently.

12. A laser scanning apparatus as claimed in claim 10, wherein the light source comprises:
a plurality of light source members each emitting a single laser beam; and
integrating means for integrating together the laser beams emitted from the light sources.

13. A laser scanning apparatus as claimed in claim 10, wherein the light source comprises:
a light source member for emitting a plurality of laser beams.

14. A laser scanning apparatus as claimed in claim 9, wherein a plane including the laser beam striking the polygonal mirror and the laser beam reflected from the polygonal mirror remains in a fixed position regardless of an angle at which the laser beam is deflected.

15. A laser scanning apparatus as claimed in claim 9, wherein, when a deflection angle in the main-scanning direction is such that a center of an image is being formed, an angle that the laser beam striking a first reflecting surface of the two reflecting surfaces forms with the laser beam reflected therefrom is equal to an angle that the laser beam striking a second reflecting surface of the two reflecting surfaces forms with the laser beam reflected therefrom, and wherein an angle that the laser beam reflected from the second reflecting surface forms with a plane including the laser beam striking the polygonal mirror and the laser beam reflected therefrom is twice as great as the angle that the laser beam entering the first reflecting surface forms with the laser beam reflected therefrom.

16. A laser scanning apparatus as claimed in claim 9, wherein the laser beam strikes the polygonal mirror from a direction perpendicular to an axis of rotation thereof.

17. A laser scanning apparatus comprising:
a light source for emitting a laser beam;
a polygonal mirror for reflecting and thereby deflecting the laser beam emitted from the light source, the polygonal mirror being rotatable about a predetermined axis of rotation; and
an imaging optical system for focusing the laser beam deflected by the polygonal mirror on a scanned surface while moving the laser beam at a substantially uniform speed across the scanned surface, the imaging optical system including two scanning mirrors each having a reflecting surface that has an optical power both in a main-scanning direction and a sub-scanning direction and neither is rotation-symmetric about an axis.

18. A laser scanning apparatus as claimed in claim 17, wherein a plane including the laser beam striking the polygonal mirror and the laser beam reflected from the polygonal mirror remains in a fixed position regardless of an angle at which the laser beam is deflected.

19. A laser scanning apparatus as claimed in claim 17, wherein, when a deflection angle in the main-scanning direction is such that a center of an image is being formed, an angle that the laser beam striking a first reflecting surface of the two reflecting surfaces forms with the laser beam reflected therefrom is equal to an angle that the laser beam striking a second reflecting surface of the two reflecting surfaces forms with the laser beam reflected therefrom, and wherein an angle that the laser beam reflected from the second reflecting surface forms with a plane including the laser beam striking the polygonal mirror and the laser beam reflected therefrom is twice as great as the angle that the laser beam entering the first reflecting surface forms with the laser beam reflected therefrom.

20. A laser scanning apparatus as claimed in claim 17, wherein the laser beam strikes the polygonal mirror from a direction perpendicular to an axis of rotation thereof.

21. A laser beam scanning apparatus as claimed in claim 17, wherein the imaging optical system further includes a cylindrical mirror.

* * * * *